US009822022B2

(12) United States Patent
Ge

(10) Patent No.: US 9,822,022 B2
(45) Date of Patent: Nov. 21, 2017

(54) METHODS AND APPARATUS FOR SOLID LIQUID SEPARATION

(71) Applicant: Shanghai YuanQing Environmental Engineering Ltd, Shanghai (CN)

(72) Inventor: Nengqiang Ge, Shanghai (CN)

( * ) Notice: Subject to any disclaimer, the term of this patent is extended or adjusted under 35 U.S.C. 154(b) by 281 days.

(21) Appl. No.: 14/497,741

(22) Filed: Sep. 26, 2014

(65) Prior Publication Data

US 2015/0090594 A1 Apr. 2, 2015

(30) Foreign Application Priority Data

Sep. 27, 2013 (CN) .......................... 2013 1 0449997

(51) Int. Cl.

*B01D 21/00* (2006.01)
*C02F 1/48* (2006.01)
*C02F 1/46* (2006.01)
*C02F 1/461* (2006.01)
*C02F 1/463* (2006.01)
*C02F 11/12* (2006.01)

(52) U.S. Cl.

CPC .......... *C02F 1/484* (2013.01); *B01D 21/0009* (2013.01); *C02F 1/463* (2013.01); *C02F 1/46104* (2013.01); *C02F 1/487* (2013.01); *C02F 11/127* (2013.01); *C02F 2301/08* (2013.01); *C02F 2303/06* (2013.01)

(58) Field of Classification Search

CPC .................................................. B01D 21/0009
USPC ........ 204/660, 664, 665, 674, 554, 557, 571
See application file for complete search history.

(56) References Cited

U.S. PATENT DOCUMENTS 4,624,763 A * 11/1986 Chimenti ............... B01D 11/04 204/562
2006/0144268 A1* 7/2006 Isono ................. B01D 17/0214 101/350.5
2010/0326831 A1* 12/2010 Munson .................... B03C 3/12 204/555

FOREIGN PATENT DOCUMENTS

CN 202766365 U * 3/2013
CN 203065319 U * 7/2013

OTHER PUBLICATIONS

Machine translation of CN203065319, published Jul. 17, 2013.*
Machine translation of CN202766365, published Mar. 6, 2013.*
Partial human translation of CN202766365, published Mar. 6, 2013.*

* cited by examiner

*Primary Examiner* — Brian W Cohen

(57) ABSTRACT

Described herein are methods and apparatus for solid-liquid separation with high efficiency, especially in treating spent filter backwash and sedimentation tank sludge produced in the water treatment process. It combines and applies gravity, electromagnetic force, dynamic filtration, and gravity condensation, magnetic and gravitational compression in one integrated device that produces high quality effluent water (less than 10 ppm suspended solid) and highly condensed sludge (less than 94-96% water content).

7 Claims, 2 Drawing Sheets

14
7
16
8
5
13
10
12
15
11
17
9
6

METHODS AND APPARATUS FOR SOLID LIQUID SEPARATION

CROSS REFERENCE TO RELATED APPLICATION

This application claims priority to the Chinese Application No. 201310449997.4, filed on Sep. 27, 2013, entitled "Methods and Apparatus for Solid Liquid Separation," all of which are hereby incorporated by reference in their entirety.

FIELD OF THE INVENTION

This invention generally relates to methods and apparatus for solid-liquid separation in an upflow sedimentation tower. In particular, this invention is directed to a process and a device allowing for high ratios in both solid-liquid separation and sludge concentration.

BACKGROUND

As a systematic process, treatment of sludge water often involves a number of systems such as a collection system, separation system, dewatering system and monitoring system. Nowadays a sludge water separation system has become a key part in water reuse and solid waste reduction.

Traditional sludge water treatment technologies can be classified into two categories based on their fundamental mechanisms: physical treatment and physic-chemical treatment. Screening, grit chamber, gravity sedimentation, filtration and centrifugal separation are typical physical treatment methods. Physic-chemical treatment includes chemical coagulation and sedimentation, clarification, floatation and membrane filtration.

In conventional water treatment plants, chemical coagulation and sedimentation treatment with traditional sedimentation tanks are commonly used because they are very cost-effective. In some situations, inclined plate settler is used as replacement of gravity sedimentation tank in order to increase the treatment efficiency and decrease the infrastructure footprint. Clarified water is pumped back to water treatment system for further treatment, while the sludge is sent to thickening and dewatering station.

However, in the above process, space required for gravity sedimentation tank, as the key unit in the process, is large due to the relatively low overflow rate of 1-2 $m^3/m^2 \cdot h$. Meanwhile, the settle sludge contains 97%-99% water, and the clarified water in gravity sedimentation tank contains more than 70 ppm suspended solid. This is beyond the water reuse standard as well as water discharge standard. Plus, the treatment efficiency is worse when there is a large amount of cation in the water.

In light of the above, a need exists for a new method and device to treat the sludge water, decrease suspended solid in the treated water and fulfill the water reuse purpose more efficiently.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One objective is to utilize a device in a process to improve solid-liquid separation so that the treatment effluent can be directly reused while reducing the consumption of other chemicals.

Another objective is to provide a device integrating a water treatment process with a highly efficient sludge thickening process to avoid large consumption of coagulation reagent and reduce the volume of sludge.

Still another goal is to provide a device that is adaptable in various treatment systems to process sludge water from different sources.

Also, one goal is to provide a device that can be scaled up or scaled down to utilize a relative small space and to reduce the construction capital cost and operating cost.

In light of the above, embodiments of the invention provide a high-efficiency solid-liquid separation tower. In one embodiment, the separation tower comprises three parts in different shapes, including a dome shape cover, a straight cylinder shaped body, and a cone shape bottom. Specifically, the straight cylinder shape body has an input port configured to receive input in a mixture of solid and liquid form. The cone shape bottom has an output port configured to deliver output in a condensed mixture of solid and liquid form. The dome shape cover having an output port configured to deliver output in a liquid form, and an output port configured to deliver output in a gaseous form.

In one embodiment, the system has a draft tube and an electromagnetic plate in the sealed high efficiency solid-liquid separation tower. The high efficiency solid-liquid separation tower is connected to an external high voltage electrostatic generator and is grounded on the bottom.

In operation, the mixture of water and sludge generated from water treatment processes is collected in the adjusting tank then pumped into the high efficiency solid-liquid separation tower. After the liquid-solid separation, the water effluent will be filtered and reused as water supply; the condensed sludge effluent will be further dewatered.

The device is used in connection with conventional processes for separating suspended solid from water to improve operating efficiency and reduce the generated sludge volume.

The device is fed by pumping the mixture of water and sludge generated from water treatment processes into the input port, the bubbles are separated from the mixture inside of draft tube and vented out through the ventilation port. Flocculants already exist in the mixture due to the previous treatment dosing. Large size solids will form and settle by gravity because of the flocculation of colloids and other suspended particles in liquids. An upward flow inside of the device is formed by passing by the draft tube and reflecting cone, at where the big size solid is separated from the mixture and settled into the cone shape on the bottom of the device by gravity. A high electromagnetic field is formed by connecting the electromagnetic plate with high voltage electrostatic generator in the bottom of the device. Smaller size solid particles are attracted to form dynamic suspension flocculation layer inside of the device to block and adsorb even smaller size particles in the upward flow and settled into the cone bottom of this device by electromagnetic force and gravity. The upward flow is adjusted by the water distribution device into steady flow to promote the formation of dynamic suspension flocculation layer. The liquid phase is clarified by the processes described above. The solid phase which settled in the cone shape bottomed of the device is grounded to discharge and allow to be further condensed to 94-96% water content. The treatment process with superficial liquid upflow velocity 10-15 m/h take 30-45 minutes with no clarifying agents is needed.

The inventive integrated device provides the advantage of combining and applying gravity, electromagnetic force, dynamic filtration, and gravity condensation, magnetic and gravitational compression into solid particle sedimentation to achieve higher quality effluent water with less than 10 ppm suspended solid for direct water reuse.

The smaller volume of sludge generated from sedimentation is another advantage of this inventive device, allowing less capital cost for further sludge condensing and thickening. For example, the water content in the sludge is 94-96%, which indicates the volume of the sludge after this process is one third of the traditional sedimentation tank generated sludge volume. The smaller sludge volume allows less following dewatering and thickening equipment such as centrifugal dehydrator is required. As a result, the capital investment cost and operation cost will be needed for further treatment processes.

Another advantage of this device is its composability, which allows connecting multiple devices in parallel to flexibly adapt different treatment volume demand. This advantage will potentially reduce the capital investment cost, operation cost, chemical consumption cost, and the construction footprint.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
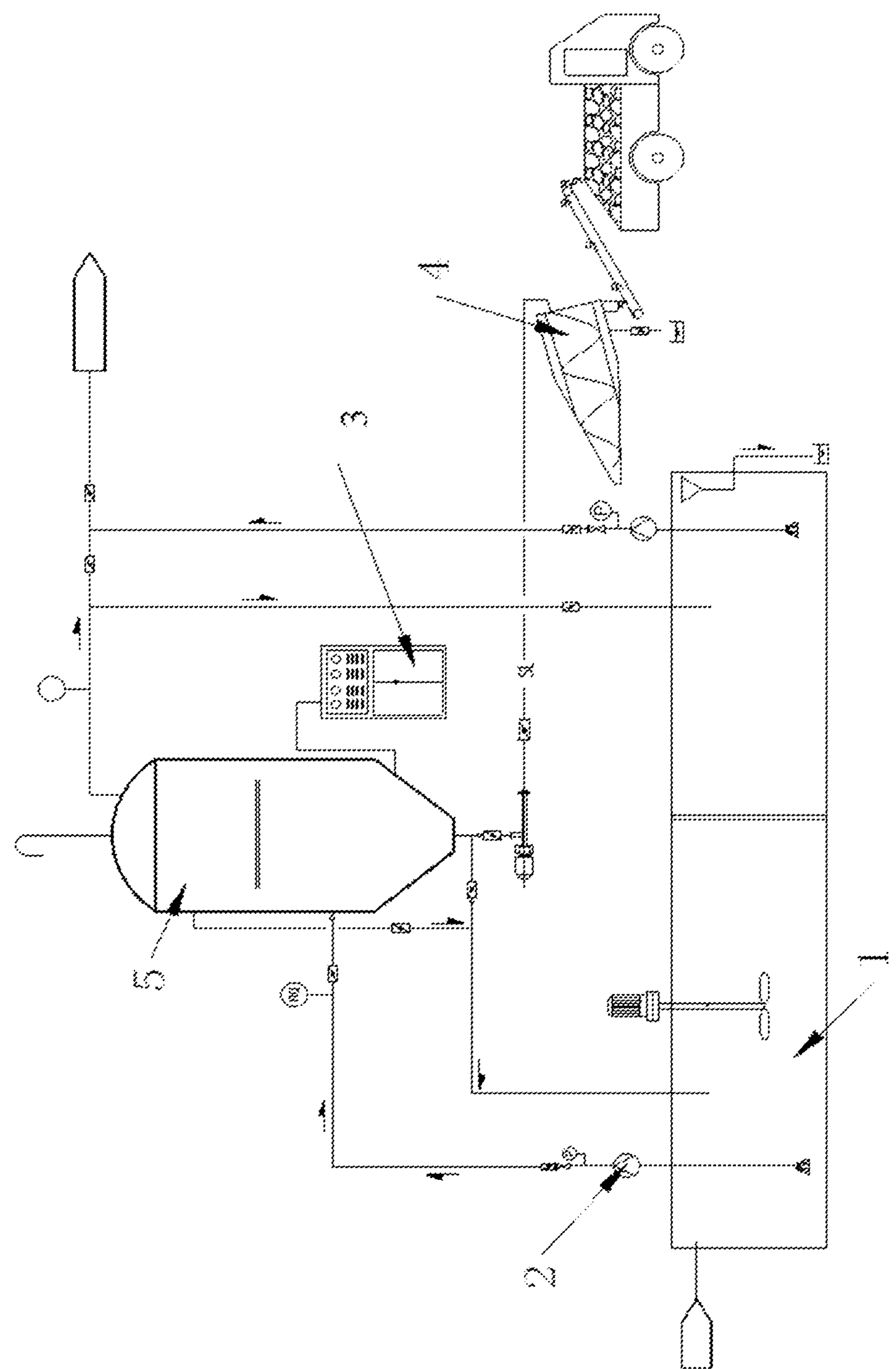
FIG. 1 is a schematic elevational view of a solid-liquid separation tower system according to embodiments of the invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to an improved method and apparatus for solid liquid separation. In one embodiment, a high-efficiency solid-liquid separation tower is provided, which comprises a dome shape cover, a straight cylinder shaped body, and a cone shape bottom, wherein said straight cylinder shape body has an input port configured to receive input in a mixture of solid and liquid form, said cone shape bottom has an output port configured to deliver output in a condensed mixture of solid and liquid form, and said dome shape cover has a first output port configured to deliver output in a liquid form, and a second output port configured to deliver output in a gaseous form.

FIG. 1 is a schematic elevational view of a solid-liquid separation tower system according to embodiments of the invention. As shown in FIG. 1, this solid-liquid separation tower system providing higher efficiency in solid-liquid separation includes an adjusting tank 1, a pump 2, a high voltage electrostatic generator 3, a centrifugal dehydrator 4, and a high-efficiency solid-liquid separation tower 5.

Figure 2:
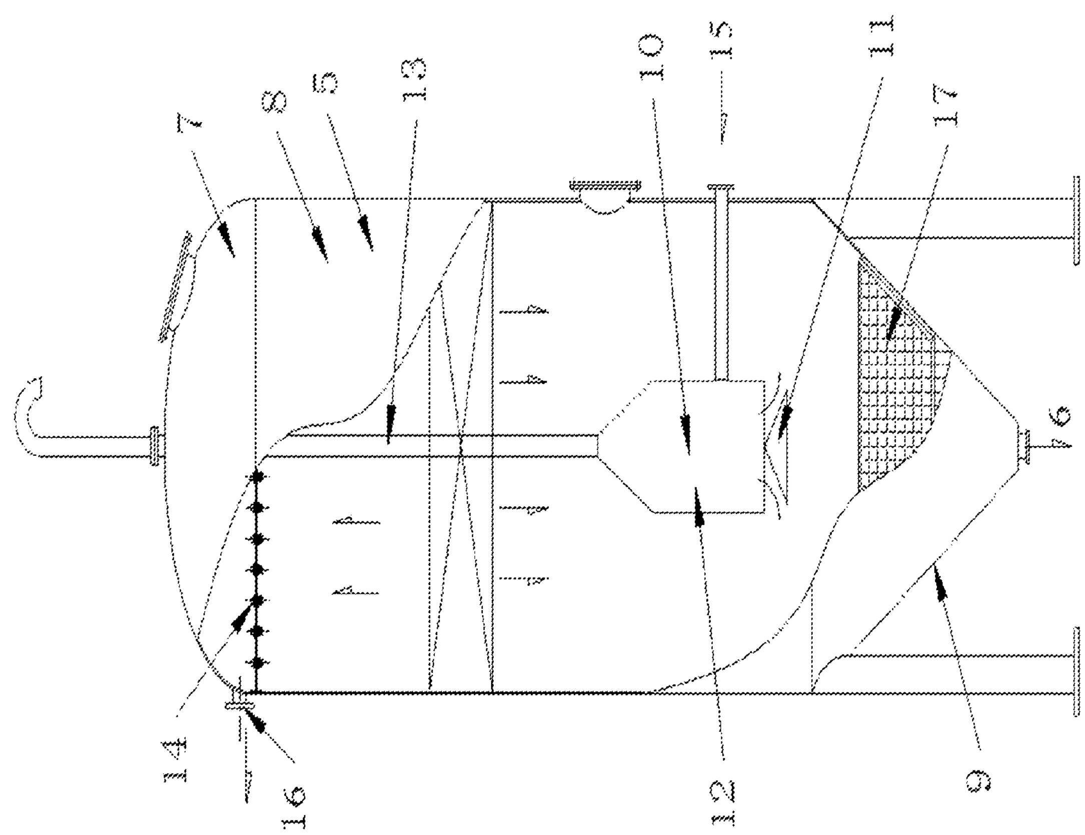
FIG. 2 illustrates details of the flow patterns during sedimentation in the system of FIG. 1 according to embodiments of the invention.

Details of the high-efficiency solid-liquid separation tower 5 are presented in a enlarged scale in FIG. 2. As shown in FIG. 2, the high-efficiency solid-liquid separation tower includes a dome shape cover 7, a straight cylinder shaped body 8, and a cone shape bottom 9. The separation tower also includes a draft tube 10, which comprises a lower part guide ring 11, a tube body 12 and an upper ventilation pipe 13.

More specifically, the dome shape cover 7 is equipped with a treated water outlet 16. The upper part of the straight cylinder shape body 8 is equipped with multiple water distributors 14. A water input 15 is such positioned that it goes through the lower part of the straight cylinder shape body 8. The cone shape bottom 9 has an output port 6 that is configured to deliver sludge. The electromagnetic plate 17 in the sealed high efficiency solid-liquid separation tower is located on the bottom of the cone shape bottom 9.

In operation, the high-efficiency solid-liquid separation tower works in the following process: collecting all the mixture of water and sludge generated from water treatment processes; pumping the mixture of water and sludge into the input port 15; separating bubbles from the mixture in the draft tube 10 and vent out through the ventilation pipe 13; forming an upward flow in the high efficiency solid-liquid separation tower by passing by the draft tube 10 and reflecting cone; separating the big size solid from the mixture; settling the big size solid into the cone shape bottom 9 by gravity; forming a high electromagnetic field by connecting the electromagnetic plate 17 with the high voltage electrostatic generator in the bottom of the high efficiency solid-liquid separation tower; attracting smaller size solid to form big size solid in the upward flow; settling the formed big size solid into the cone bottom of the high efficiency solid-liquid separation tower by electromagnetic force and gravity; adjusting the upward flow by the water distributors 14 into a steady flow; forming coagulation of suspended solids in the steady flow; recovering the treated water from the output port on the dome shape cover of high efficiency solid-liquid separation tower; discharging the electric charge of solids by grounding the bottom of the high efficiency solid-liquid separation tower; and condensing and discharge the sludge in the cone bottom of the high efficiency solid-liquid separation tower.

In some embodiments, existing flocculants in the wastewater is utilized. In some embodiments, a small amount of coagulant aids need to be dosed to improve coagulation. The above-described process can be used to treat the wastewater within 30-45 detention period with a flow velocity of 10-12 m/h.

As will be described in the following example, the above-described separation tower provides higher efficiency in separating the liquid and solid.

EXAMPLE

To start with, a device as above described was fed by a sludge mixture of biological filter backwash water and sedimentation sludge. The feeding waster sludge is with high turbidity consists of sands, colloids, and other find particles. The water sludge contained 8139 ppm suspended solids. A sedimentation tank with 2-3 hours hydraulic retention time was used for comparison.

During the test, the suspended solid in effluent of the device was less than 10 ppm, with turbidity less than 5 NTU. The effluent of the device met the standard of sedimentation tank effluent for drinking water, which is good enough for reusing. The sludge contains 95% water with a consistent discharge rate. In comparison, the reference sedimentation tank effluent contained 97-99% water, 80-100 ppm suspended solid with turbidity of 100-150 NTU. Further treatment processes were needed in order to reuse the water.

Table 1 below shows the effluent water quality of high efficiency solid-liquid separation tower system, as compared to a traditional sedimentation tank:

| | | Turbidity (NTU) | Suspended Solid (ppm) | Water content in the generated sludge (%) |
|---|---|---|---|---|
| Influent | | N/A | 8139 | N/A |
| Effluent | High efficiency solid-liquid separation tower system | 2.6 | 8.41 | 95.2 |
| | Traditional sedimentation tank | 151.1 | 74.33 | 98.5 |

To treat the solid effluent, a footprint and dewatering equipment is needed. For further comparison between the inventive apparatus and traditional sedimentation tank, different volumes of sludge effluent requiring the footprint and dewatering equipment and corresponding results are shown in Table 2 below:

| | Footprint ($m^2$) | | dewatering equipment (sets) | |
|---|---|---|---|---|
| Volume of sludge water ($m^3$/h) | High efficiency solid-liquid separation tower system | Traditional sedimentation tank | High efficiency solid-liquid separation tower system | Traditional sedimentation tank |
| 150 | 13.85 | 125 | 1 | 3 |
| 300 | 27.7 | 250 | 2 | 6 |
| 600 | 55.4 | 500 | 3 | 9 |
| 1000 | 97 | 834 | 4 | 12 |
| 1500 | 138.5 | 1250 | 5 | 15 |

As seen from the above, the inventive apparatus allows for a significant reduction of turbidity and suspended solids of effluent as well as the water contents in the sludge effluent.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A solid-liquid separation tower system comprising:

a solid-liquid separation tower comprising a dome shape cover, a straight cylinder shaped body, and a cone shape bottom, said solid-liquid separation tower connected to an external voltage electrostatic generator;

a draft tube within said solid-liquid separation tower, said draft tube comprising a tube body, a reflecting cone external to said tube body and attached to a lower part of said tube body and a ventilation pipe attached to an upper part of said tube body; and an electromagnetic plate on said cone shape bottom, wherein said straight cylinder shape body has an input port configured to receive input in a mixture of solid and liquid form, said cone shape bottom has an output port configured to deliver output in a condensed mixture of solid and liquid form, and said dome shape cover has a first output port configured to deliver output in a liquid form, and a second output port configured to deliver output in a gaseous form, and wherein said draft tube separates said input in the mixture of solid and liquid form into bubbles and an upward flow, said bubbles traversing said ventilation pipe and are vented out through said second output port, and said upward flow passes over said reflecting cone.

2. The system of claim 1, wherein said electromagnetic plate is lined inside the cone shape bottom and is negatively charged by being connected to said external-voltage electrostatic generator.

3. The system of claim 1, further comprising one or more water distributors inside said dome shape cover, said water distributors adjusting the upward flow to a steady flow.

4. The system of claim 1, wherein said ventilation pipe is connected to said second output port and extends outside said solid-liquid separation tower.

5. The system of claim 1, wherein said output in the condensed mixture of solid and liquid is formed by:

settling first solids in said input in the mixture of solid and liquid into said cone shape bottom of said solid-liquid separation tower by gravity;

attracting second solids in said input in the mixture of solid and liquid to form third solids in the upward flow as a result of the electromagnetic plate connected to said external voltage electrostatic generator; and settling said third solids into said cone bottom of said solid-liquid separation tower by an electromagnetic force and gravity, wherein said first and third solids are larger than said second solids.

6. The system of claim 3, wherein said output in the liquid form is formed by separating a coagulation of suspended solids from said steady flow, said coagulation of suspended solids settled into said cone bottom of said solid-liquid separation tower by an electromagnetic force and gravity.

7. The system of claim 1, wherein said output in the liquid form is treated water.

* * * * *